(12) United States Patent
Dillat et al.

(10) Patent No.: US 6,183,265 B1
(45) Date of Patent: Feb. 6, 2001

(54) DEVICE FOR CONNECTING POWER CABLE CONDUCTORS TO DISTRIBUTION CABLE CONDUCTORS

(75) Inventors: Michel Louis Romain Dillat, Courbevoie; Franck R. Chopin, Saint Nazaire, both of (FR)

(73) Assignee: Proptic, Rosny-Sous-Bois (FR)

( * ) Notice: Under 35 U.S.C. 154(b), the term of this patent shall be extended for 0 days.

(21) Appl. No.: 09/142,499

(22) PCT Filed: Mar. 11, 1997

(86) PCT No.: PCT/FR97/00422

§ 371 Date: Nov. 19, 1998

§ 102(e) Date: Nov. 19, 1998

(87) PCT Pub. No.: WO97/34427

PCT Pub. Date: Sep. 18, 1997

(30) Foreign Application Priority Data

Mar. 12, 1996 (FR) .................................................. 96 03082

(51) Int. Cl.[7] .................................................. H01R 29/00
(52) U.S. Cl. .............................................. 439/49; 361/827
(58) Field of Search ............................ 174/60; 361/823, 361/827, 826; 439/49; 379/327

(56) References Cited

U.S. PATENT DOCUMENTS 3,573,373 * 4/1971 Mullin .................................. 361/827
3,666,996 * 5/1972 Brown .................................. 361/823
3,708,628   1/1973 Hendriks .............................. 174/160
4,160,880 * 7/1979 Brey .................................... 361/827

FOREIGN PATENT DOCUMENTS 37 43 108 A1   7/1989 (DE) .
38 01 876 A1   8/1989 (DE) .

* cited by examiner

Primary Examiner—Neil Abrams
(74) Attorney, Agent, or Firm—Oliff & Berridge, PLC

(57) ABSTRACT

A device for electrically connecting power cable conductors to distribution cable conductors includes a panel that supports contact modules that have contacts and that are distributed along a circle about a hub and that pass through the thickness of the panel. On a rear side of the panel the contacts are joined to conductors of the cables. On a front side of the panel the contacts are joined to jumper wires, which may be wrapped about the hub and passed between the teeth of a circular comb. In another embodiments, a panel supports structures forming guide chutes for jumpers and pivotally mounted caps for added protection of the jumpers. The panel may be pivotally mounted at an axis for easy access to the rear side and may support a rotatable arm for aid in preparing jumper wire ends. In another embodiment a pair of opposed panels are coupled at internal surfaces to conductors of cables and on their outer surfaces to jumpers, the jumpers passing through aligned openings in the panels.

18 Claims, 10 Drawing Sheets

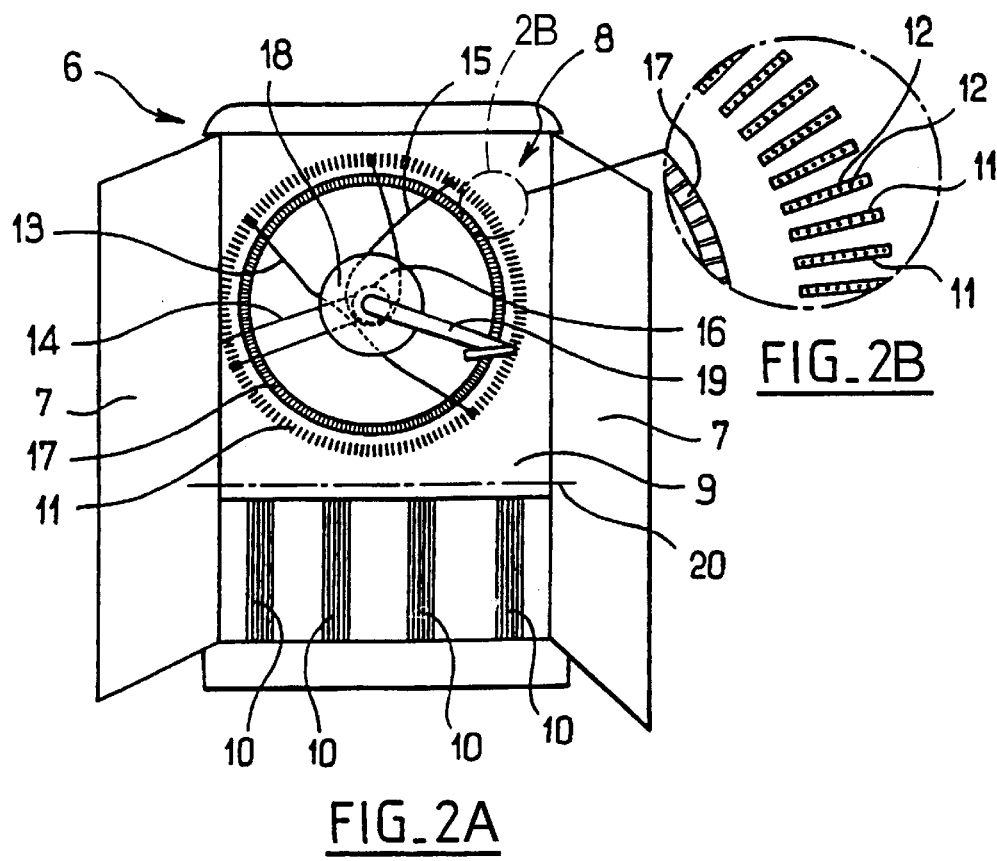
FIG_2A
FIG_2B
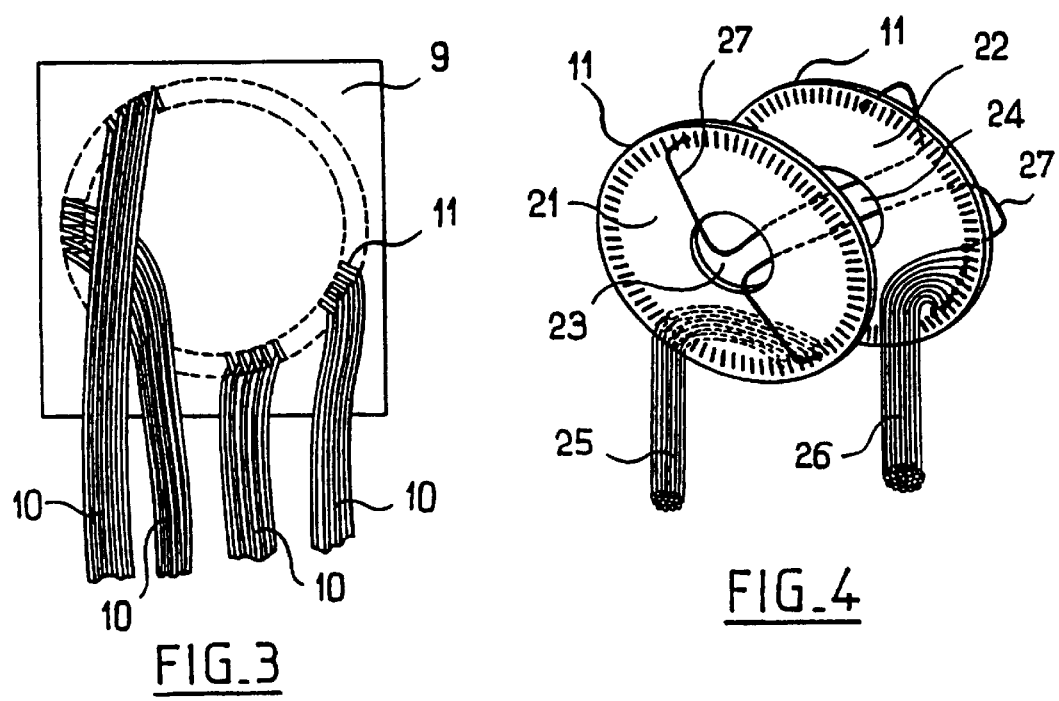
FIG_3
FIG_4

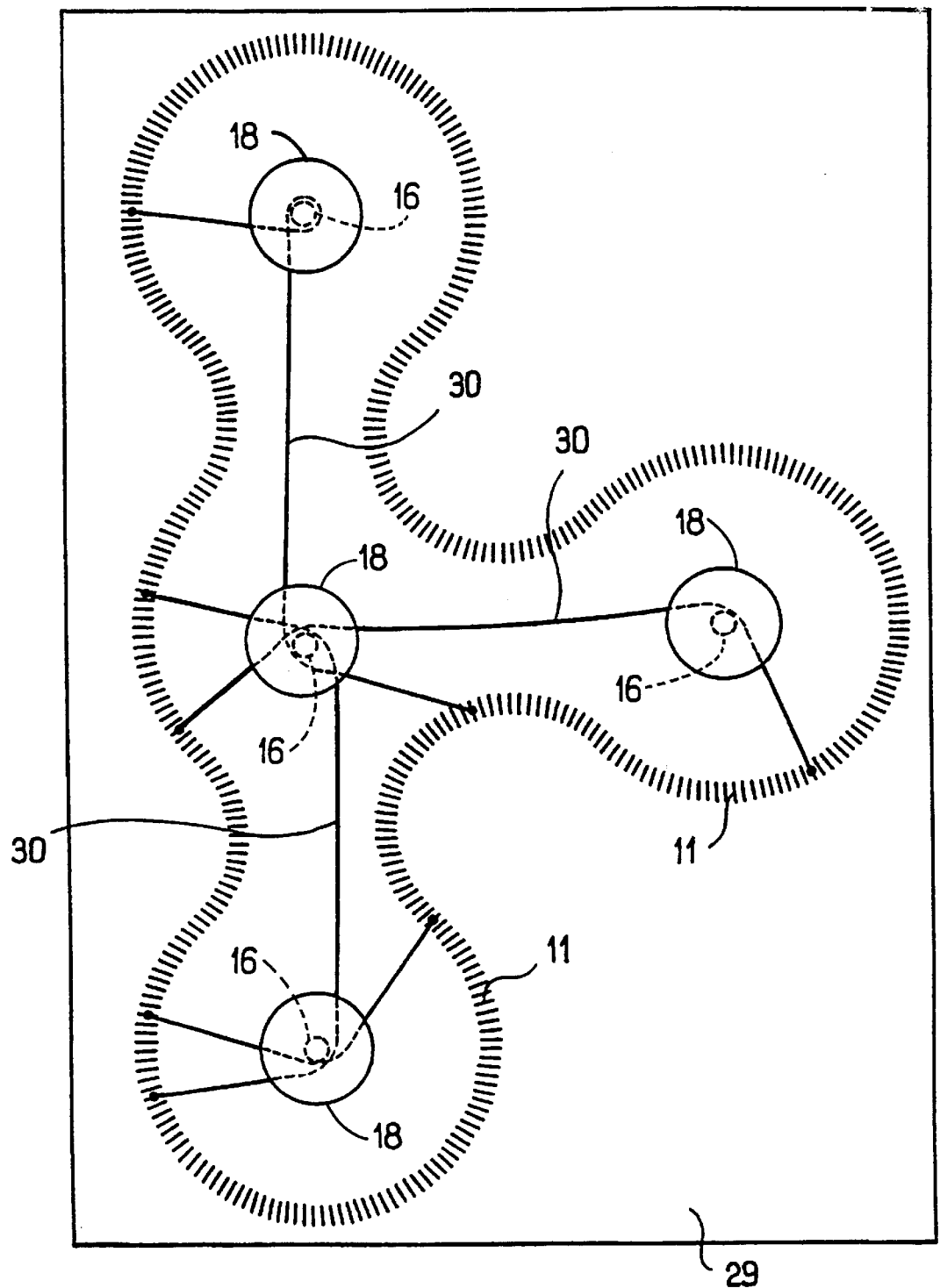
FIG_5

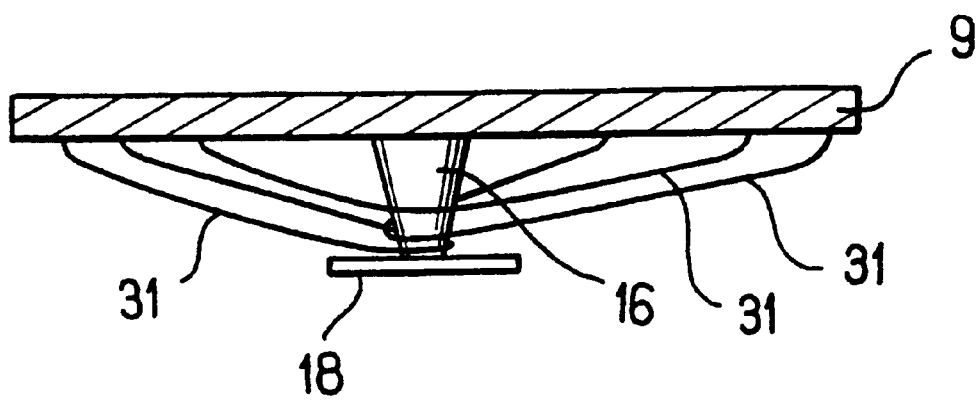
FIG_6
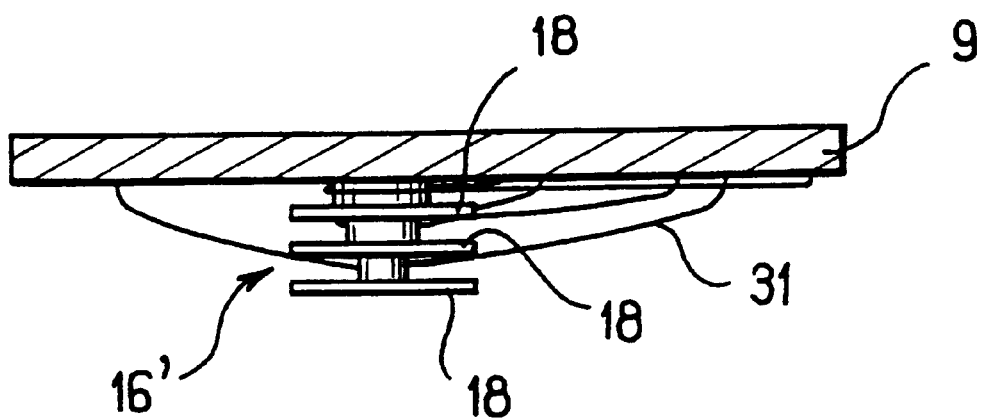
FIG_7

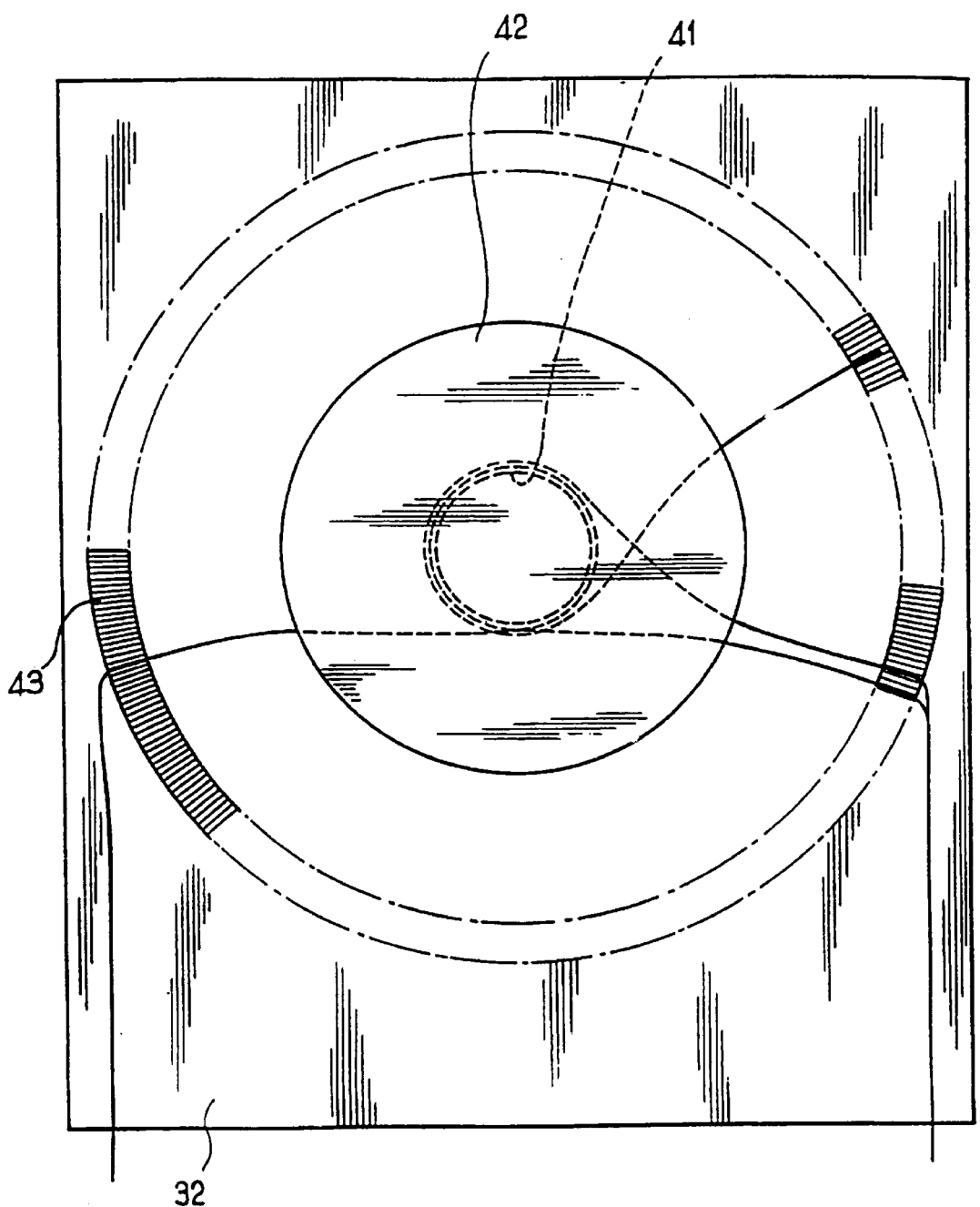
FIG_9

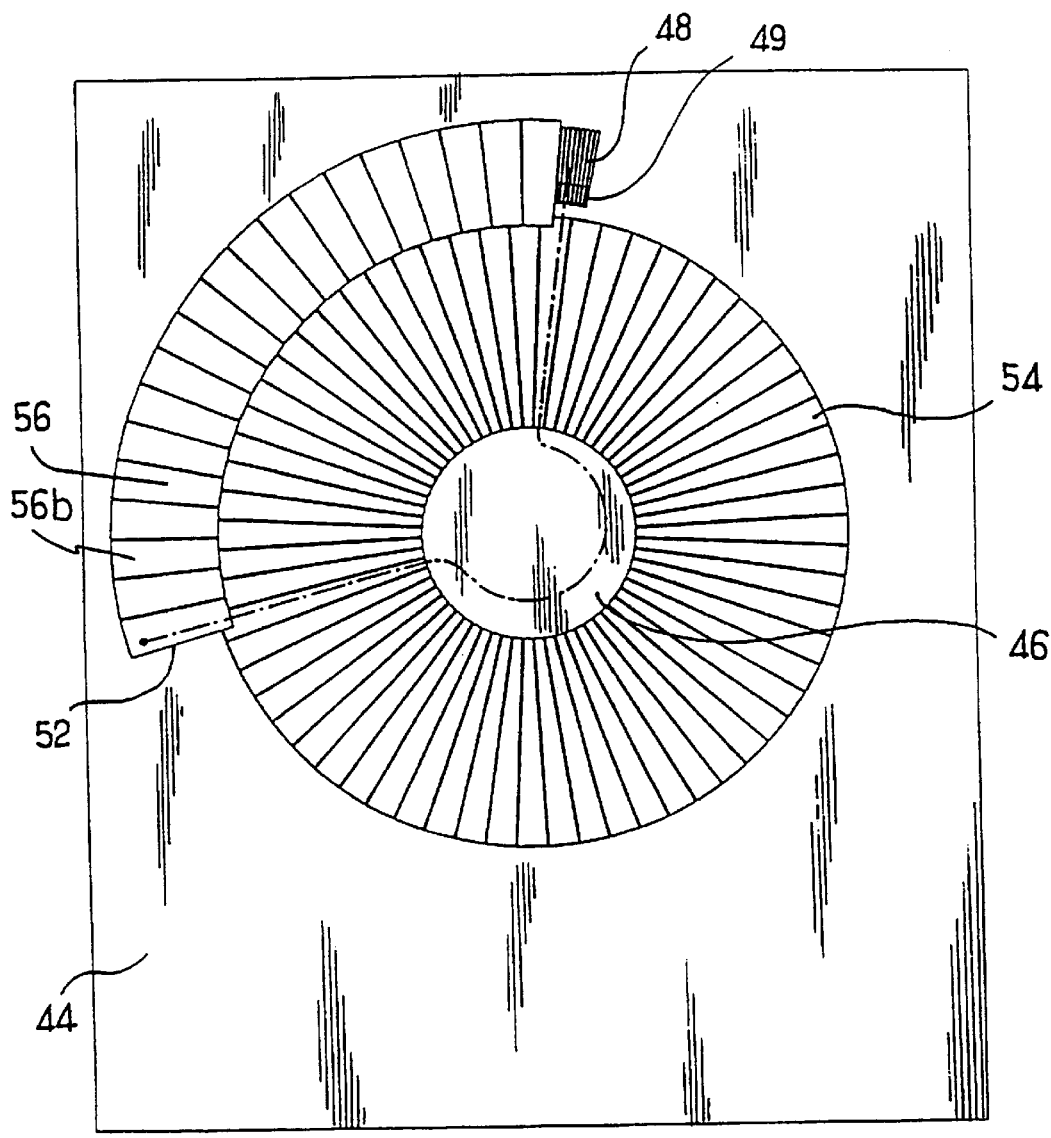
FIG_10
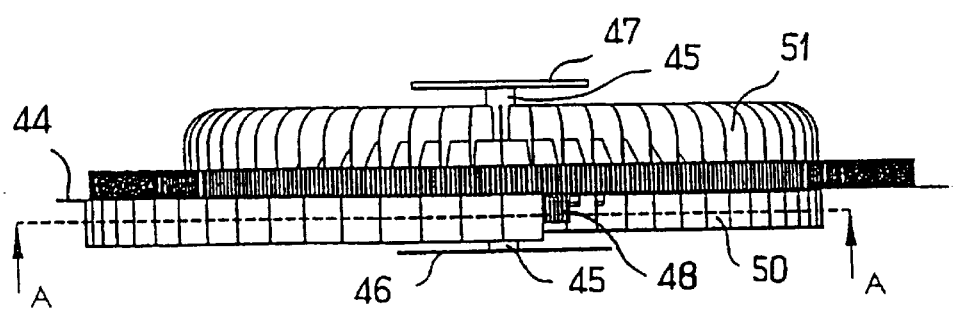
FIG_11

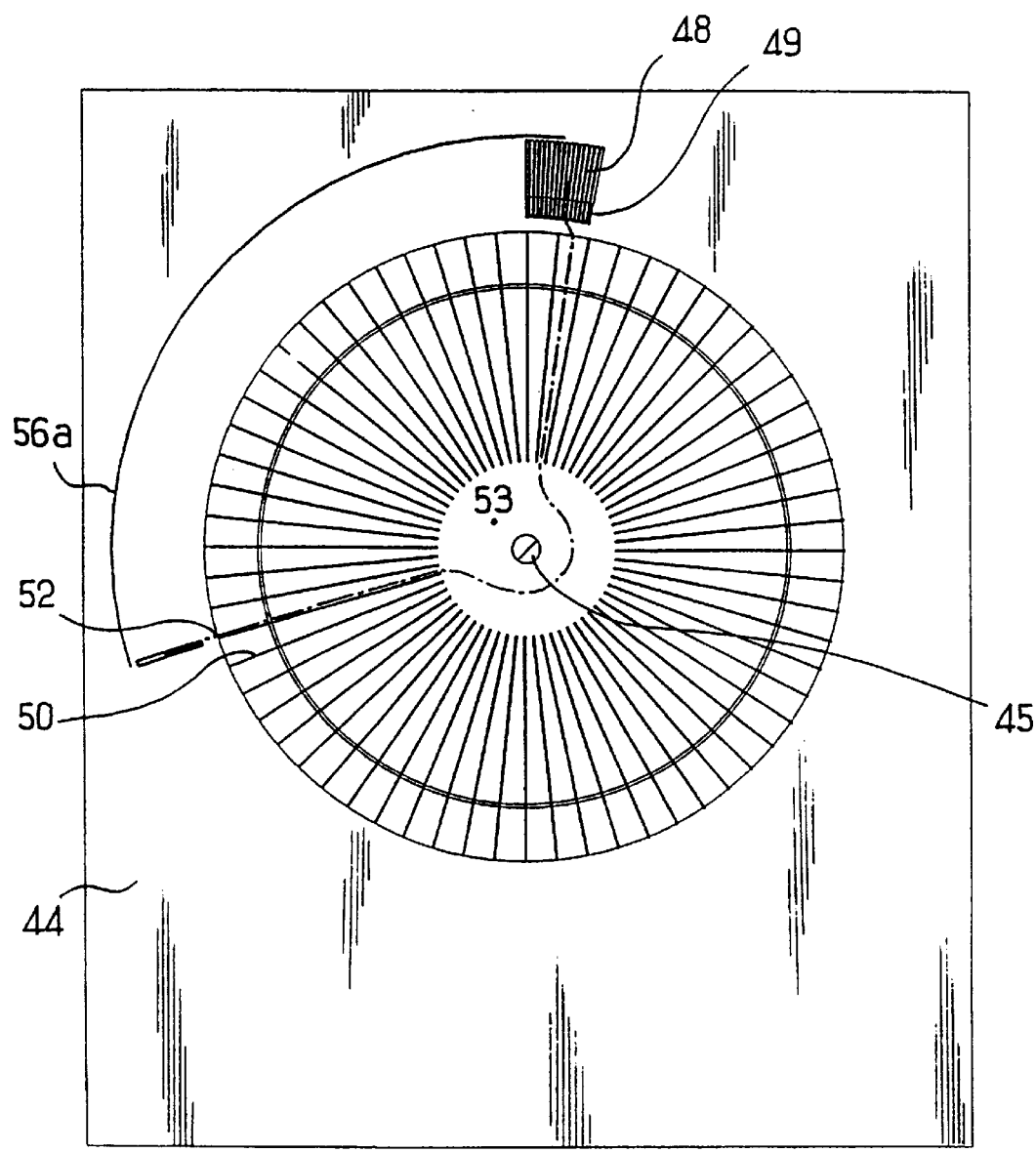
FIG_12

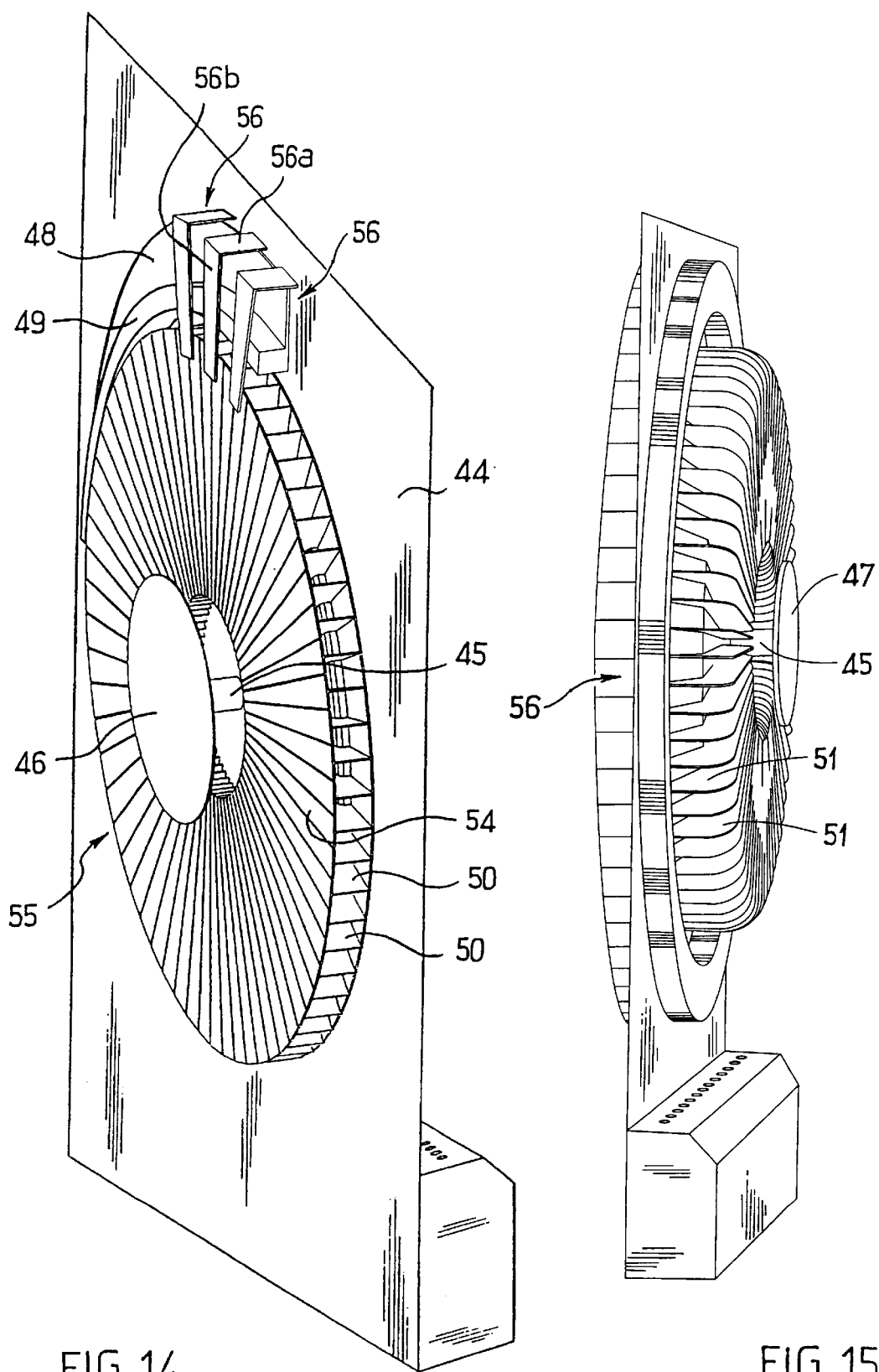
FIG_14  FIG_15

DEVICE FOR CONNECTING POWER CABLE CONDUCTORS TO DISTRIBUTION CABLE CONDUCTORS

BACKGROUND OF THE INVENTION

The present invention concerns a device for connecting conductors of a power cable to conductors of a distribution cable.

Located at the various nodes of a distribution network are devices with which one or more power cables can be connected to one or more distribution cables in order to create spurs of the network.

These devices are referred to, depending on their level within the network, as distribution boxes, distribution or splitter terminals, interior or exterior subdistributors, and distributors.

In each case, at least one power cable and at least one distribution cable arrive at the device, where they are connected in appropriate fashion, each conductor of the power cable, or power conductor, being connected to a conductor of the distribution cable, or distribution conductor, via a linking conductor also referred to as a "jumper."

In existing communication networks, the cable heads are arranged vertically one above another, mounted on trusses which are constituted by vertical formed sections.

A plurality of trusses are generally placed alongside one another so that the set forms a two-dimensional distributor in which the cable heads are distributed in rows and columns.

The power cable terminates at certain cable heads, and the distribution cable terminates at other cable heads, and the jumpers link the cable heads two by two by passing within the distributor along the lines and columns of the latter.

The conductors can be electrical conductors, i.e. generally copper wires, or optical conductors, i.e. optical fibers.

In the first case, the jumpers are constituted by segments of electrical wire, while in the second case they are segments of optical fiber.

In both cases, the arrangement in rows and columns of the cable heads demands the use of jumpers having lengths which differ from one pair of conductors to another.

This is detrimental to the general organization of the distributor, and does not allow easy visual identification of the various jumpers linking the power cables to the distribution cables.

A particular problem arises when one wishes to modify a connection by changing only the distribution conductor connected to a power conductor.

The reason is that the jumpers are generally so intermingled with one another that it is impossible to displace one of the ends of a jumper in order to connect it to another distribution conductor.

It is thus preferable to cut the two ends of the jumper and leave it in place, then to add a new jumper between the power conductor and the new conductor of the distribution cable.

Work must therefore be performed at regular intervals on the distributor to revise all the connections and eliminate the jumpers that have become superfluous.

SUMMARY OF THE INVENTION

The purpose of the present invention is to furnish a device which eliminates the above disadvantages in particular while being easy to manage and maintain and particularly simple and economical to implement.

The object of the present invention is a device for connecting the conductors of a power cable to conductors of a distribution cable, the ends of the conductors being mounted in stationary fashion on the device and being capable of being linked to one another via jumpers which are each connected on the one hand to a conductor of the power cable and on the other hand to a conductor of the distribution cable, wherein the ends of the conductors of the power cable and/or of the distribution cable are distributed around a hub on which the jumpers which each link two conductor ends can be wound.

In other words, the invention consists in arranging the ends of the conductors which are linked to one another via jumpers not along rows and columns, as in the existing art, but around a hub.

In a particular embodiment, the ends of the power and/or distribution cable conductors are distributed substantially along a circle.

According to the invention, the term "substantially along a circle" is understood to mean that the ends of the power and distribution cable conductors are located in the vicinity of an open or closed line drawn around the hub; this line can be not only a circle but also an oval, an ellipse, a square, or a rectangle, this list not being limiting.

All the jumpers can thus have an identical length which is similar to the diameter of the circle or to the greatest width of the line along which the conductor ends are distributed.

This may prove extremely interesting from a practical point of view, since such identical-length jumpers can be prepared in advance in a factory.

In the case of optical conductors in particular, this advantage eliminates the need for on-site cutting, stripping, and splitting of the optical fibers constituting the jumpers, which is a delicate operation.

In the device according to the invention, removal of a jumper which has become superfluous presents no problem, since the jumpers are not entangled with one another.

In addition, the device according to the invention does not necessitate the presence of a truss but requires simply a support, for example a panel or a wheel, on which the conductor ends can be placed around the hub.

It can nevertheless be adapted to an existing distributor using a specific support that is adaptable to a truss.

The fact that the conductor ends are placed around a hub according to the invention also makes it possible to achieve a connection density much greater than that which can be achieved with a traditional distributor. The overall dimensions of the distributor can thus be reduced.

In a particular embodiment of the invention, the device has a panel, the power and distribution cables being situated on one side of that panel, the conductor ends being distributed on the panel substantially along a circle, the jumpers being situated on the other side of the panel where they link the ends of the conductors to which they are connected through said panel.

This embodiment facilitates maintenance of the device by making it possible, for example by tilting the panel, to work on the couplings of the power and distribution cable conductors without having to access the rear surface of the device.

It is evident that it is particularly easy to displace only one of the ends of a jumper to connect it to another conductor without thereby needing to detach its other end. Displacement of the end of the jumper is accomplished by simply rotating the jumper segment extending from the hub to the end of the jumper to be displaced.

Advantageously, the hub exhibits an appropriate cross section for facilitating organization of the jumpers.

The hub may thus have a truncated conical shape which allows jumpers to be collected in the vicinity of the panel as necessary.

The hub can also have several compartments, thus preventing tangling of the jumpers.

In this case, the diameter of the hub can vary from one compartment to another in order to compensate for the increase in the distance to be covered by the jumper due to the axial offset of the compartment. For example, the diameter of the hub can decrease with increasing distance from the panel on which the conductor ends are arranged in a circle.

The diameter of the hub is of particular importance in cases where the conductors are optical fibers, since it guarantees a minimum radius of curvature for the jumpers.

Advantageously, the device has a means for holding the jumpers on the hub, for example a circular comb situated inside the circle along which the conductor ends are distributed.

The terminal portions of the jumpers are then wedged between two teeth of the comb, which holds them in place.

In a preferred variant, the device has a means for guiding end portions of the jumpers which ensures that they are positioned in a direction that is substantially radial with respect to the hub, so as to facilitate their engagement in the teeth of the comb.

This guiding means can furthermore serve as a support for the jumpers, preventing those which are too long from interfering with access to the jumper ends where the latter connect to the ends of the power and distribution cable conductors.

To protect the jumper ends, the device advantageously has protective caps which cover a set of jumper ends.

With the purpose of protecting the jumpers over their entire length, the device can have a set of radial chutes capable of receiving multiple jumpers and extending from the vicinity of the hub to the vicinity of the ends of the power and distribution cables, these chutes being closed off by a partition equipped with a slot which allows a single jumper to pass through.

In a particular embodiment of the invention, the device has an arm mounted pivotably about an axis passing through the center of the hub, which can correspond to the center of the circle along which the conductor ends are distributed, the length of said arm being substantially identical to the radius of the circle.

It is possible to mount on such an arm, for example, a tool with which jumpers can be prepared for connection to the conductor ends, the tool being displaceable along the circle by rotation of the arm.

A magnifier can also be provided at the end of the arm to facilitate the work of the operator responsible for installing the jumpers.

In use, it may be preferable for the ends of the power and distribution conductors to be grouped in angular sectors around the hub, each angular sector corresponding, for example, to a geographical area served by the distribution cable conductors or to a geographical area from which the conductors of the power cable arrive.

According to an advantageous variant, the device also has a hub on the side of the panel where the power and distribution cables are situated, the conductors of said cables being wound around this hub and their ends being distributed substantially along a circle or an open or closed line.

In a particular embodiment of the invention, the device has two substantially parallel panels which each have an external surface facing away from the external surface of the other panel and an internal surface facing toward the internal surface of the other panel and each equipped with an opening; the two openings being in alignment with one another and forming a hollow hub; the power and distribution cables being situated between the internal surfaces of these two panels; the ends of the power cable conductors being distributed on the first panel around the opening; the ends of the distribution cable conductors being distributed on the second panel around the opening; the jumpers extending from the external surface of the first panel, where they are each connected to an end of a power cable conductor through the first panel, to the external surface of the second panel, where they are each connected to an end of a distribution cable conductor through the second panel; said jumpers passing through the openings of the first and second panels.

In other words, in this embodiment the device has two panels, the first of which is reserved for the power cable conductors while the second is reserved for the distribution cable conductors, the links between these conductors being accomplished via jumpers which pass from one panel to the other by crossing their central open portions which constitute a hollow hub.

In another embodiment of the invention, the device has, on a single panel, a plurality of hubs around which the ends of the power and distribution cable conductors are distributed, a space being reserved for the jumpers to pass between two adjacent hubs.

According to the invention, the conductors can be light conductors, i.e. optical fibers, or electricity conductors, i.e. electrical wires, or any other conductors which must be connected to one another.

BRIEF DESCRIPTION OF THE DRAWINGS

In order to explain the invention further, an explanation will now be given of embodiments provided as non-limiting examples, with reference to the attached drawings in which:

FIG. 2a is an elevation of a device according to the invention;

FIG. 2b is a detail of an elevation shown in FIG. 2a;

FIG. 3 is a view from behind of the panel of the device of FIG. 2a;

FIG. 4 is a perspective view depicting another embodiment of the device according to the invention;

FIG. 5 is an elevation of a device according to another embodiment of the invention;

FIG. 6 is an axially sectioned view of a hub of a device according to the invention;

FIG. 7 is a view, analogous to FIG. 6, of a variant of the hub;

FIG. 9 is a view from behind of the device of FIG. 8;

FIG. 10 is an elevation of a device according to another embodiment of the invention;

FIG. 11 is a view from above of FIG. 10;

FIG. 12 is a sectioned view along A—A of FIG. 11;

FIG. 14 is a view analogous to FIG. 13, the device being viewed from the other side and certain protective caps having been removed; and FIG. 15 is a three-quarter rear perspective view of the device of FIGS. 10 through 14.

DETAILED DESCRIPTION OF PREFERRED EMBODIMENTS

Figure 1:
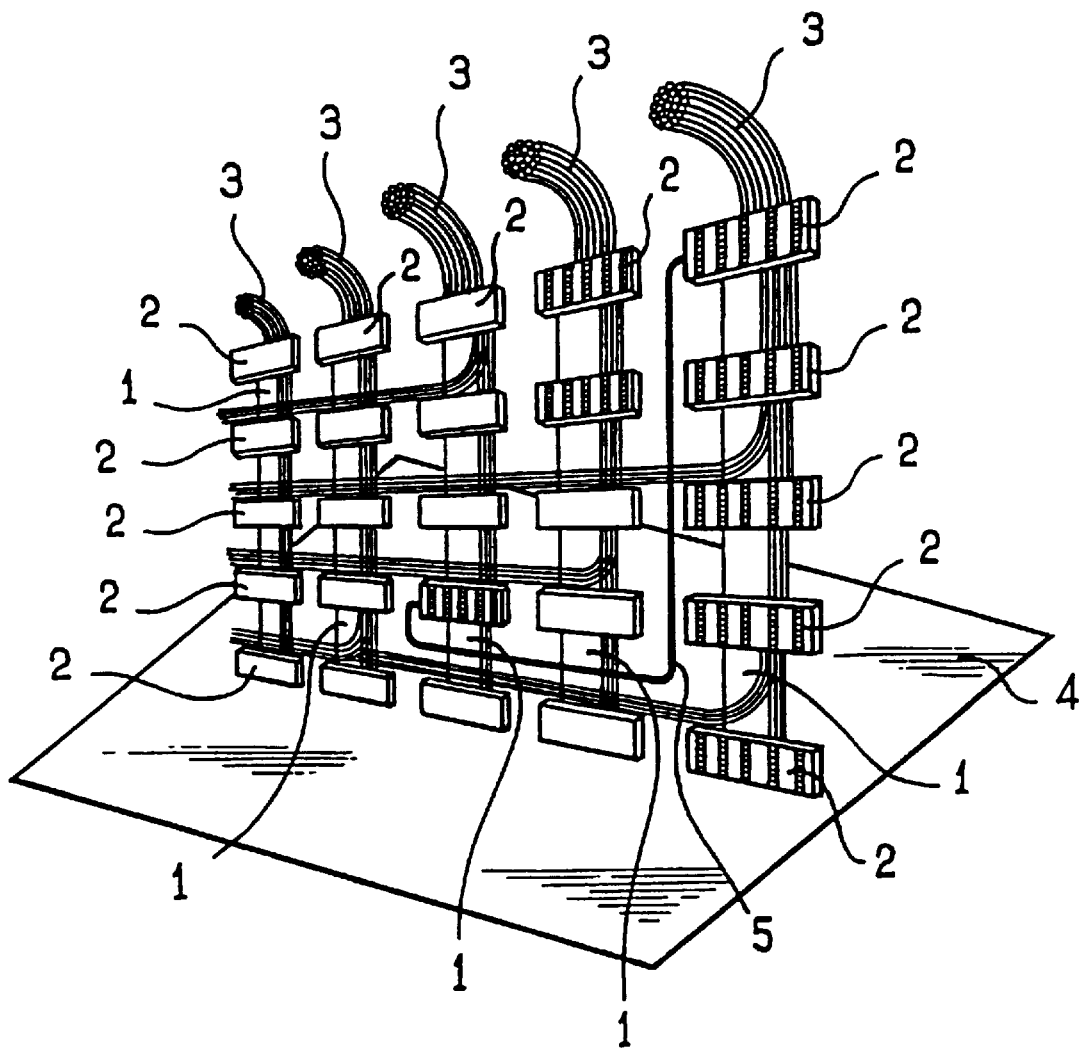
FIG. 1 is a perspective view of a distributor according to the existing art.

The conventional distributor depicted in FIG. 1 comprises five trusses 1, constituted by metal formed sections, arranged vertically alongside one another.

Each truss supports a set of five cable heads 2 which are thus distributed along five rows and five columns of the distributor.

Bundles of cables 3 arrive at the distributor through the upper part thereof. Other bundles of cables (not depicted) arrive through the lower part of the distributor beneath floor 4 which supports it.

As is evident from FIG. 1, the cables pass within the distributor along the latter's rows and columns.

Each conductor of a cable is connected to a contact of a cable head 2 on the rear surface thereof.

For greater clarity in the drawing, the contacts have been depicted on only eight of the twenty-five cable heads depicted here.

The front surfaces of the cable heads are intended to receive jumpers which link the contacts two by two.

A single jumper 5 is depicted in FIG. 1. It is evident that this jumper was prepared in customized fashion so as to pass horizontally and then vertically within the distributor between the two contacts which it is linking.

The distributor depicted in FIG. 2a comprises a cabinet 6 with two doors 7, inside which is housed a device 8 according to the invention.

This device 8 comprises a panel 9, the front surface of which is visible in FIG. 2 and the rear surface of which is visible in FIG. 3.

Bundles of cables 10 terminate at panel 9 through the lower part of cabinet 6 and are connected on the rear surface of panel 9 in contact modules 11 which pass through the thickness of panel 9.

Contact modules 11 are distributed on panel 9 along a circle.

In the detail view of FIG. 2b, it is apparent that contact modules 11 appear on the front surface of panel 9 where they exhibit a certain number of contacts 12 each capable of receiving the end of a jumper by simple insertion.

Three jumpers 13, 14, and 15 are depicted in FIG. 2a.

These jumpers all have substantially the same length, this length being similar to the diameter of the circle along which contact modules 11 are distributed.

A hub 16 is situated at the center of the circle to serve as support for jumpers 14, 15, which can thus be extended between-their two ends while additionally held between the teeth of a comb 17, also of circular shape, situated inside the circle formed by contact modules 11.

It is clear that the jumpers arranged in this fashion are intermingled with one another only in the vicinity of hub 16, i.e. over a small portion of their length.

Extraction of a jumper that has become superfluous, or displacement of one of the ends of a jumper from one contact 12 to another, thus entails no difficulty.

Visual identification of the jumpers is moreover facilitated, especially if the contact modules are distributed by angular sector on the basis of the power and/or distribution cables 10 to which they correspond, as is evident from FIG. 3.

Opposite panel 9, hub 16 supports a disk 18 which retains the jumpers on said hub.

An arm 19, mounted pivotably on disk 18 and having a length substantially equal to the radius of the circle formed by the contact modules, may serve for the placement of equipment with which the jumper ends can be prepared.

This arm 19 may also be used to automate connection changes between the power conductors and distribution conductors.

It is thus possible, remotely, to perform coupling changes or to implement slow switching of subscribers, particularly in an optical fiber network.

The fact that the power and distribution cables 10 terminate on the rear surface of panel 9 makes it possible, by simply pivoting panel 9 with respect to a horizontal axis 20, to work on the couplings between the cables and the contact modules without having to access the rear of cabinet 6.

In contrast to prior distributors whose trusses cannot be individually swiveled because of the cables which link them to one another and which must therefore be accessible from behind, the device according to the invention can thus be placed against a wall.

In the embodiment depicted in FIG. 4, the device comprises two panels 21, 22 which are cut out in the shape of wheels, held parallel to one another with their internal surfaces facing one another and their external surfaces outward.

Each wheel 21, 22 is open in its central portion 23, 24.

As described above, conductor cables terminate at the wheels, a power cable 25 being coupled to the internal surface of wheel 21 while a distribution cable 26 is coupled to the internal surface of wheel 22.

Jumpers 27 link, two by two, the contacts appearing on the external surface of wheel 21 to the contacts appearing on the external surface of wheel 22, passing from one wheel to the other through openings 23, 24.

Thus, as described above, all the jumpers of the device exhibit the same length, which is substantially equal to the diameter of the wheels plus the distance separating said wheels.

In this embodiment, management of the jumpers can be facilitated by the fact that all the couplings to the power cable conductors are made on the same surface of the device, while all the couplings to the distribution cable conductors are made on the other surface of the device.

By mounting the two wheels 21 and 22 on a single support articulated about a horizontal axis, like panel 9 of FIG. 2a, it is possible to install the device of FIG. 4 in a cabinet and access the external surface of wheel 22 by swiveling the support.

In the embodiment of FIG. 5, multiple circles of contact modules 11 are arranged on a single panel 29, spaces being reserved between the centers of two adjacent circles for the passage of jumpers 30 linking the contacts present on those circles.

In this embodiment, several jumper lengths must be provided, but the number of different lengths required is only three, which is very low considering the large number of contacts combined on this single panel 29.

FIG. 6 depicts, in section, panel 9, hub 16, and disk 18 of FIG. 2.

The truncated conical shape of the hub allows jumpers 31 to be grouped in the vicinity of disk 18, which prevents them from accumulating in the vicinity of panel 9.

In the variant depicted in FIG. 7, hub 16' is compartmentalized by having a plurality of disks 18.

This limits the risk of entangling the jumpers.

It may be noted that the diameter of hub 16' increases in the direction of panel 9, so that the jumper length necessary to connect two contacts remains identical regardless of the hub compartment used by that jumper.

Figure 8:
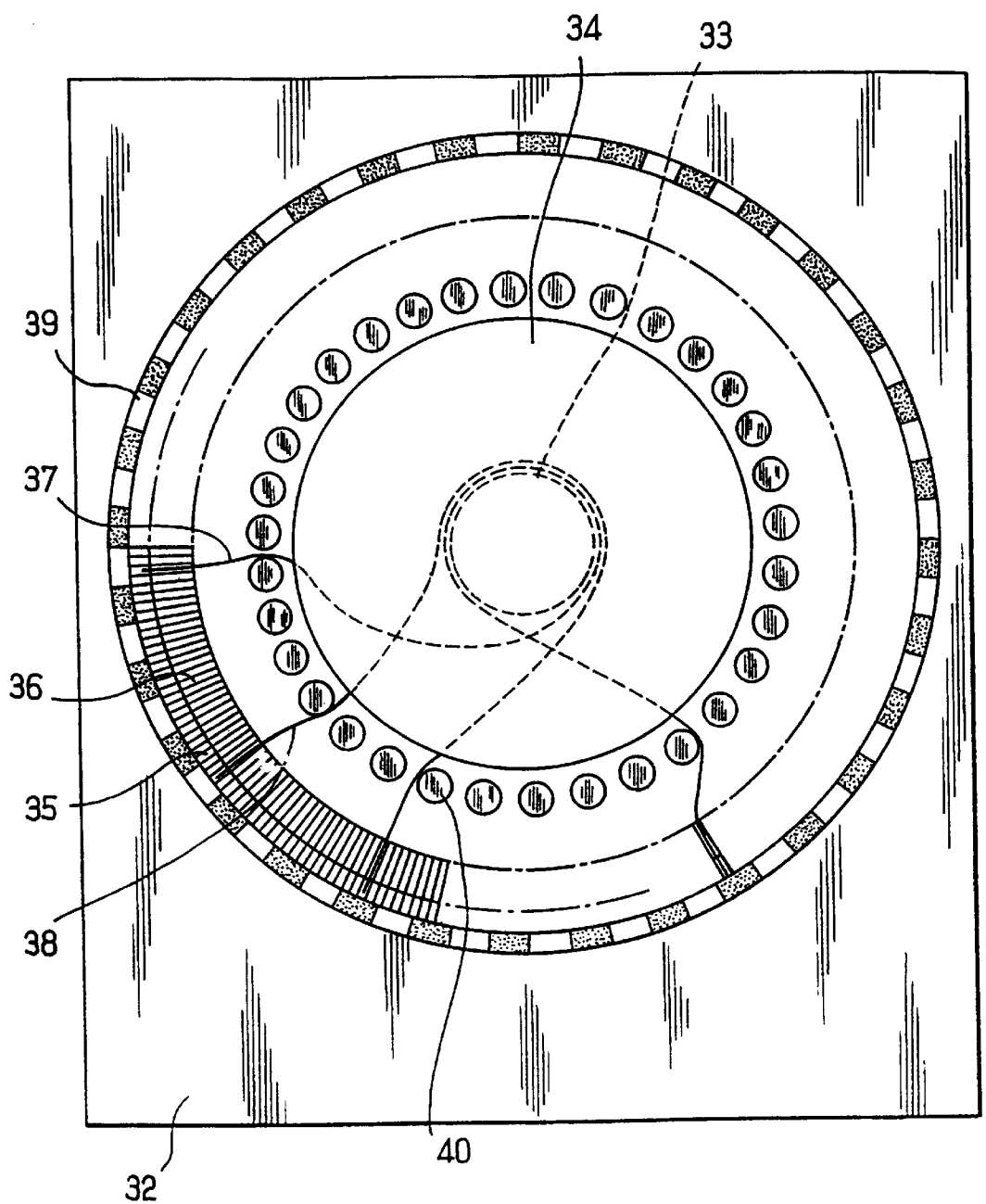
FIG. 8 is an elevation of a device according to another embodiment of the invention.

The device depicted in FIGS. 8 and 9 comprises a vertical panel 32 on whose front surface a hub 33 bearing a disk 34 is mounted. Contact modules 35 (only some of which have been depicted in the Figure) are distributed on the panel along a circle that is concentric with hub 33 and disk 34.

Combs 36 are adjacent to contact module 35, the function of these combs being to hold jumpers 37, 38 in position.

At the periphery of contact modules 35, the panel has a marking 39 which allows contact modules 35 to be identified visually.

A plurality of cylindrical studs 40, distributed in a circle on the panel around disk 34, constitutes a means for guiding the end portions of the jumpers, ensuring that they are positioned in a substantially radial direction with respect to the hub, in particular to facilitate their engagement into the teeth of comb 36.

These cylindrical studs 40 moreover perform the function of keeping the jumpers sheltered by disk 34, in the event that, for example, a jumper of excessive length, although wound on the hub, extends beyond the lower portion of disk 34.

As is evident from FIG. 9, panel 32 also has a hub 41 on its rear surface; this hub 41 can be the extension of hub 33 of the front surface.

A disk 42 similar to disk 34 of the front surface is also carried by hub 41.

The power and distribution cables arrive through the lower edge of panel 32 and rise vertically to a peripheral comb 43 which allows the optical fibers to penetrate radially beneath disk 42 and wind around hub 41.

In the embodiment of FIGS. 10 through 15, the device again has a vertical panel 44 carrying a hub 45 which passes completely through it and projects from both surfaces, hub 45 carrying a disk 46, 47 on the front and rear surfaces of panel 44.

As described above, contact modules 48 and a circular comb 49 surround the hub.

Radial partitions 50 (see FIGS. 12 and 14) on the front surface of panel 44, and radial partitions 51 (see FIGS. 13 and 15) on the rear surface of panel 44 have been provided around each hub to keep the fibers in a radial orientation with respect to the hub.

On the front surface, jumpers 52 thus leave a contact module 48 and engage between two radial partitions 50, then enter an open space 53 surrounding hub 45 beneath disk 46, then once again penetrate between two radial partitions 50 and terminate at another contact module 48.

On the rear surface of panel 44, the optical fibers emerging from the power and distribution cables engage between radial partitions 51 and then wind around hub 45 beneath disk 47.

On the front surface of panel 44, protection has furthermore been provided for the fibers, intended especially to prevent any alteration to the jumpers if a tool should be dropped by an operator working on the device.

This protection is constituted by vertical partitions or fins 54 which are each mounted on a radial partition 50 and are arranged next to one another to form a kind of disk 55 having multiple radial slots, each slot, which is in fact the space separating two adjacent fins, allowing a jumper to be introduced between two radial partitions.

In other words, the assembly constituted by the radial partitions and the fins forms a partitioned assembly whose various channels or chutes, delimited between panel 44, radial partitions 50, and fins 54, converge toward hub 45.

The jumpers are also protected at the level of each contact module 48 by swiveling caps 56 each constituted by a partition 56a perpendicular to panel 44 and tangent to a circle constituted by the set of contact modules 48, and a partition 56b, perpendicular to partition 56a, which extends from the tip of partition 56a toward hub 45 to a point above fins 54.

Each cap 56 is articulated on panel 44 at the base of its partition 56a.

Figure 13:
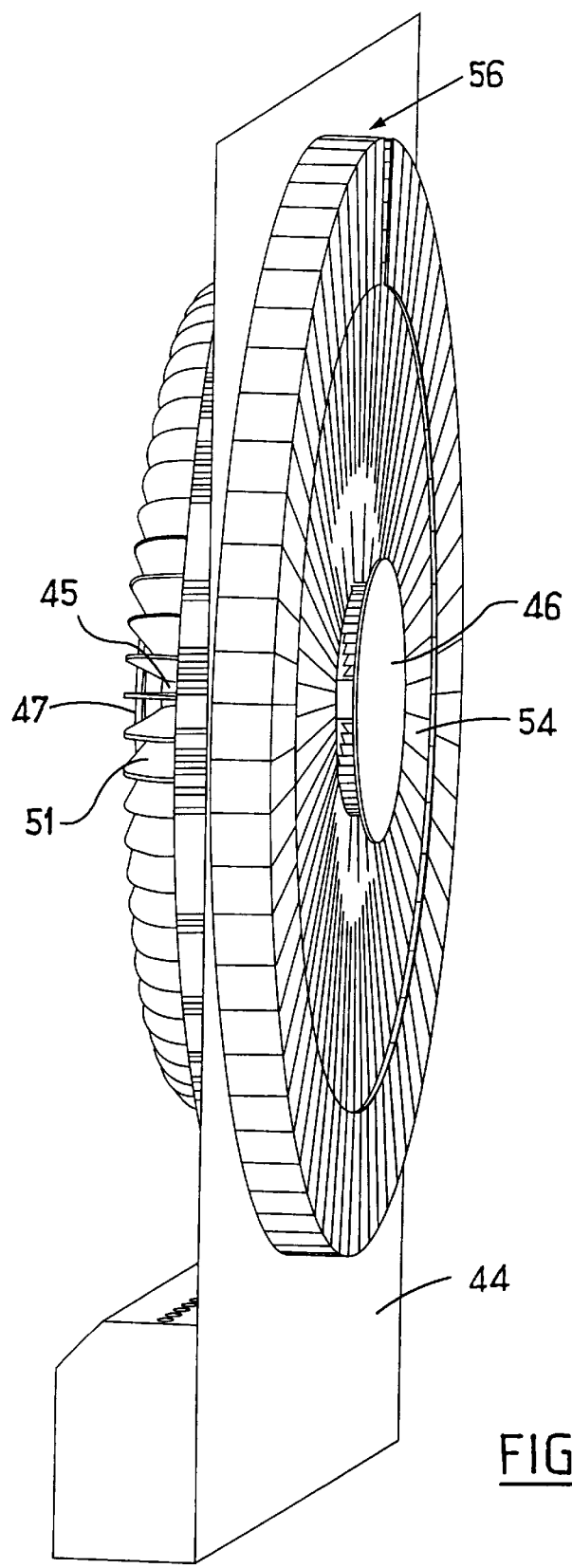
FIG. 13 is a three-quarter frontal perspective view of the device of FIGS. 10 through 12.

FIG. 13 depicts all the caps 56 in the folded-down position, forming a sort of crown that prolongs fins 54 and thus ensures integral protection for the jumpers over their entire length.

In FIG. 14, most of the contact modules 48 as well as combs 49 have been omitted, and only two protective caps 56 have been retained, making them easier to observe.

It is understood that the embodiments which have just been described are in no way limiting in nature, and that they may be modified in any manner desired without thereby leaving the context of the invention.

What is claimed is:

1. A device for connecting conductors of a power cable to conductors of a distribution cable, comprising:
at least one support surface having contacts, ends of the power cable conductors and distribution cable conductors fixedly mounted on the at least one support surface and linked to one another via jumpers through said contacts which are each electrically connected to an end of a conductor of the power cable and to an end of a conductor of the distribution cable, and a hub mounted on the support surface, the ends of the conductors of at least one of the power cable and the distribution cable being distributed around the hub, the hub maintaining the position of the jumpers wherein the ends of at least one of the power and distribution cable conductors are distributed substantially along a circle centered on the hub.

2. The device as defined in claim 1, wherein the at least one support surface comprises a panel, the power and distribution cables being situated on one side of the panel, the conductor ends being distributed on the panel substantially along a circle, the jumpers being situated on the other side of the panel and linking the ends of the conductors to which the jumpers are connected through said panel.

3. The device as defined in claim 2, wherein the hub is situated on the side of the panel where the power and distribution cables are situated, the conductors of said cables being wound around the hub.

4. The device as defined in claim 1, wherein the hub has a truncated conical shape.

5. The device as defined in claim 1, wherein the hub has a plurality of compartments for limiting the risk of entangling the jumpers.

6. The device as defined in claim 5, wherein a diameter of the hub varies for each of said plurality of compartments in order to compensate for an increase in distance to be covered by each jumper due to an axial offset of each respective compartment.

7. The device as defined in claim 1, further comprising a means for holding the jumpers on the support surface.

8. The device as defined in claim 7, wherein the holding means comprises a comb situated radially inside conductor ends which are distributed radially about the hub.

9. The device as defined in claim 1, further comprising an arm mounted pivotably about an axis passing through the center of the hub for placement of equipment with which the jumper ends may be prepared.

10. The device as defined in claim 1, further comprising a means for guiding end portions of the jumpers which ensures that the jumpers are positioned in a direction that is substantially radial with respect to the hub.

11. The device as defined in claim 1, further comprising protective caps covering a set of jumper ends.

12. The device as defined in claim 1, further comprising a set of radial chutes capable of receiving multiple jumpers and extending from the vicinity of the hub to the vicinity of the ends of the power and distribution cables, the chutes being closed off by partitions, the space between adjacent partitions forming slots, the slots allowing a single jumper to pass through.

13. The device as defined in claim 1 comprising a panel comprised of said support surface, a plurality of hubs on the panel around which the ends of the power and distribution cable conductors are distributed substantially along a plurality of circles, each said circle centered on each respective hub, and a space on the panel along each said circle being reserved for the jumpers to pass between the centers of two adjacent circles.

14. The device as defined in claim 1, wherein the jumpers are at least partially wound around the hub.

15. A device for connecting conductors of power cables to conductors of distribution cables, comprising:

two substantially parallel panels, each of which has an external surface facing away from an external surface of the other panel and an internal surface facing toward an internal surface of the other panel and each parallel panel is equipped with an opening, the two openings being in alignment with one another;

the power cables and distribution cables being situated between the internal surfaces of these two panels, ends of the power cable conductors being distributed on the first panel around the opening in said first panel and ends of the distribution cable conductors being distributed on the second panel around the opening in said second panel; and jumpers extending from the external surface of the first panel, where the jumpers are each connected to an end of a power cable conductor through the first panel, to the external surface of the second panel, where the jumpers are each connected to an end of a distribution cable conductor through the second panel, said jumpers passing through the openings of the first and second panels.

16. A method for connecting conductors of a power cable to conductors of a distribution cable, comprising:

mounting a hub on an at least one support surface, said support surface having contacts;

distributing and mounting ends of the conductors of the power cable and ends of the conductors of the distribution cable to said contacts substantially along a circle centered around the hub;

connecting ends of the conductors of the power cable to ends of the conductors of the distribution cable with jumpers connected to said contacts; and maintaining a position of the jumpers with the hub.

17. The method defined in claim 16, wherein the jumpers are at least partially wound around the hub.

18. A method for connecting conductors of a power cable to conductors of a distribution cable, comprising:

providing two substantially parallel panels, each panel having an opening, the openings being in alignment with each other;

distributing and mounting ends of the conductors of the power cable and ends of the conductors of the distribution cable on the panels around the aligned openings; and connecting ends of the conductors of the power cable on one said panel to ends of the conductors of the distribution cable on the other said panel with jumpers passing through the aligned openings, thereby maintaining a position of the jumpers with the aligned openings.

* * * * *